(12) United States Patent
Shapiro (10) Patent No.: US 7,571,176 B2
(45) Date of Patent: Aug. 4, 2009

(54) SELECTIVE FILE ERASURE USING METADATA MODIFICATIONS

(76) Inventor: Alan Joshua Shapiro, 1256 Hardscrabble Rd., Chappaqua, NY (US) 10514

( * ) Notice: Subject to any disclaimer, the term of this patent is extended or adjusted under 35 U.S.C. 154(b) by 316 days.

(21) Appl. No.: 11/611,886

(22) Filed: Dec. 17, 2006

(65) Prior Publication Data

US 2007/0174367 A1    Jul. 26, 2007

Related U.S. Application Data (60) Provisional application No. 60/753,635, filed on Dec. 22, 2005, provisional application No. 60/747,201, filed on May 14, 2006.

(51) Int. Cl.
*G06F 17/00*        (2006.01)
(52) U.S. Cl. .................. 707/101; 707/102; 707/103 R; 707/104.1
(58) Field of Classification Search ............... 707/1–10, 707/100–104.1, 200–206
See application file for complete search history.

(56) References Cited

U.S. PATENT DOCUMENTS

| | | | |
|---|---|---|---|
| 6,760,721 B1 | 7/2004 | Chasen et al. | |
| 6,915,307 B1 | 7/2005 | Mattis et al. | |
| 2003/0046493 A1 | 3/2003 | Coulson | |
| 2003/0154206 A1 | 8/2003 | Kanai | |
| 2005/0132126 A1 | 6/2005 | Lin et al. | |
| 2006/0224818 A1 | 10/2006 | Stewart | |
| 2006/0224902 A1 | 10/2006 | Bolt | |
| 2006/0259587 A1 | 11/2006 | Ackerman et al. | |
| 2006/0277183 A1* | 12/2006 | Nichols et al. | ............. 707/9 |
| 2007/0005874 A1 | 1/2007 | Dodge | |

FOREIGN PATENT DOCUMENTS

| EP | 1 688 922 A2 | 8/2006 |
|---|---|---|
| JP | 2003 323371 | 11/2003 |

\* cited by examiner

*Primary Examiner*—Isaac M Woo
(74) *Attorney, Agent, or Firm*—Charles A. Lemaire; Jonathan M. Rixen; Lemaire Patent Law Firm, P.L.L.C.

(57) ABSTRACT

A process that ensures the virtual destruction of data files a user wishes to erase from a storage medium, such as a hard drive, flash drive, or removable disk. This approach is appropriate for managing custom distributions from a large file sets as it is roughly linear in compute complexity to the number of files erased but is capped when many files are batch erased.

27 Claims, 11 Drawing Sheets

Erasing a single file in ext2

Figure 1A: Areas of ext2 file affected by selective erasure methods

Figure 1B: Erasing a single file in ext2

Figure 2A: Areas of UDF file and directory affected by selective erasure methods. Note that this figure does not include the "free extent" file, which is modified the same way in both the original and invented methods.

Figure 2B: Erasing a single file in UDF. This flowchart does not include all actions taken by the "standard" delete that the new method does as well.

Figure 3A: Areas of FAT32 file and directory structures affected by selective erasure methods. Default behavior zeroes the entries in the FAT, but not the directory, except for the first byte of the file name.

Figure 3B: Erasing a single file in FAST32. This flowchart does not include all actions taken by the "standard" delete that the new method does as well.

Figure 4: Deleting many files from an ext2 directory.

Figure 5: Deleting many files from an UDF directory.

Figure 6A: Deleting many files from an FAT32 directory.

Figure 6B: Freeing blocks in the FAT after batch deletion

Figure 7: Data layout and free space for files A, B, C, and D. Note that the first blocks of each file are contiguous on the disk, making it faster to erase the first blocks. This approach makes it more difficult to recover usable copies of the files. Files B and C are spread across the media, making it more difficult to locate all of the blocks after deleting the metadata in the inode, directory entry, or FAT.

SELECTIVE FILE ERASURE USING METADATA MODIFICATIONS

CROSS-REFERENCE TO RELATED APPLICATIONS

This invention is related to U.S. Provisional Patent Application 60/753,635 filed Dec. 22, 2005 entitled "RAPID DISPENSING OF STORED DIGITAL CONTENT", and U.S. Provisional Patent Application 60/747,201 filed May 14, 2006 entitled "APPARATUS AND METHOD FOR SELECTIVELY DISPENSING SOFT ASSETS VIA SUBTRACTIVE INSTALLATION", which are both hereby incorporated by reference in its entirety.

FIELD OF THE INVENTION

The present invention relates to the field of computer file system technology and, in particular, to a method, system, and program product for quickly and securely erasing files.

BACKGROUND

Computer operating systems (OS) employ file systems to associate the complexity of physical storage hardware to logical abstractions that can be more easily and uniformly manipulated. Modern file systems use a hierarchy of directories (sometimes known as folders and subfolders) and directory entries to keep track of the file names on a file system stored within diverse storage media, including magnetic hard drives, flash memory drives, or optical media such as compact disks or DVDs.

In such file systems, the directory entry for a file typically points to a list of blocks that contain the file's data. The exact format of the directory entry and block list varies with on the specific type of file system (e.g., Linux ext2, FAT32, NTFS, or UDF), but this general approach is widely used because it is simple and can track files and their contents with a minimum of overhead.

Often, it is necessary to delete files from a file system for various reasons, including the need to free up space they are using, the need to replace the file with a more recent version, and the need to remove the file so that its data will no longer be accessible to users of the file system. In order to delete a file, most file systems must accomplish two tasks: marking the file's directory entry as "unused," and making the file blocks that the file was using available to subsequently created files.

If the goal of deleting the file is to ensure that nobody can ever recover the data contained in the file, file systems completely and destructively overwrite the file's data blocks one or more times with known patterns or random data before deletion, ensuring that the contents cannot be read without disassembling the media device.

Overwriting technology is widely known. For example, U.S. Pat. No. 6,731,447 "Secure data file erasure" issued to Keith G. Bunker, et al. on May 4, 2004, and is incorporated herein by reference. Bunker et al. describe a process that ensures the destruction of data files a user wishes to completely erase from a storage medium, such as a hard drive or removable disk. A system administrator can select a quantity of and pattern to be used in overwrites of the data file so that no one can recover the data from the storage medium.

A variant of the data-overwrite approach is the encrypt overwrite approach whereby the data is not permanently lost if one possess the cryptographic key. For example, U.S. Pat. No. 5,265,159 "Secure file erasure" issued to Kenneth C. Kung, on Nov. 23, 1993, and is incorporated herein by reference. Kung describes a method of securely deleting a file on a storage medium of a computer system so that it is not readable, wherein an encryption algorithm is used to encrypt the data in the stored file prior to a conventional deletion process. His invention permits a user to erase files from a permanent storage space in a manner that makes the file totally unreadable by others. When a user requests deletion of a stored file, the file is encrypted so that it is not readable. The user has an option to undelete the file by decrypting the file as long as this operation is done before the storage space is used by another program.

While these data overwriting approaches to file deletion are very secure, they also very slow, being roughly linear in speed to the amount of data erased. Erasing via overwriting all of the files on a 500 gigabyte hard drive in this fashion can require many hours. Encrypting is slower yet as it requires additional compute resources in addition to the data overwriting time.

Instead, nearly all modern file systems take a much simpler, but less secure, approach: they mark directory entries as "unused" and leave most of the other structures on disk untouched. This approach sets a flag in the directory entry, typically changing a single word on disk, and writes the directory entry back to disk. At this point, the file is considered deleted from the point of view of a file system user and the directory entry is available for reuse for future files that might be written, but the entry is largely unchanged otherwise.

After marking the directory entry as "unused," the file system must also make the blocks that the file was using available for use by other files. This can be done in several ways, the most common of which are a bitmap or a free list. In file systems such as Linux ext2, a bitmap records uses a single bit for each block in the file system, with one value (1, for example) indicating that the corresponding block is free, and the other value (0) indicating that the corresponding block is incorporated into a file and thus unavailable for use. In such a system, the file system frees the blocks associated with a file by setting the bits associated with the blocks to 1. This marking is arbitrary but consistent within a file system. Other systems, like NTFS, may use the opposite convention.

No other activity is necessary; thus, file systems concerned with efficiency do not destroy the structures in the blocks themselves that describe the relationship of the blocks to the now-deleted file. This approach makes it straightforward to recover a file that has been deleted if no other files have reused the directory entry or media blocks; however, this is a drawback if the file should not be recoverable. The second kind of file system, such as UDF, maintains a list of blocks that are available (UDF actually uses extents—ranges of blocks—rather than individual block numbers, but the approach is the same). The identifiers for blocks that were used in the now-deleted file are added to the list of blocks available for reuse without necessarily altering the data within the blocks themselves. Not changing block content makes it straightforward to recover the file and its contents using the flagged directory entry and associated (unmodified) block pointers, as long as the data blocks have not been reallocated to another file.

What is needed is a rapid means to erase files singly and in batch while making file recovery very difficult but not necessarily impossible. This protects non-unique digital assets by making data recovery cost more than the replacement value of the digital assets at risk, such as commercial software programs, music tracks, video, and still pictures and the like. By escalating piracy effort from a brief, self-service utility approach to an day-long, expert effort equipped with a $250,000 suite of tools, then a potential pirate more likely would just buy a fresh software package, music track, or movie rather than attempting to restore deleted files.

SUMMARY OF THE INVENTION

In accordance with the present invention, substantially all file information mapping logical to physical storage is deleted. One embodiment is directed to a method for rendering data stored on a storage medium inaccessible. The method includes but is not limited to destroying metadata that identifies a location on the storage medium at which the data is stored such that at least a portion of the data cannot be located on the storage medium by reading of metadata; and leaving a substantial portion of the data intact on the storage medium upon completion of the method. Other embodiments provide fast selective bulk erase and make data harder to recover. These methods work particularly well for creating unique distributions of files derived from a common base.

DETAILED DESCRIPTION

In accordance with the present invention, we offer a unique approach to deleting files through altering file metadata that is not as secure as totally overwriting the data in the files, but is significantly more secure than loosely flagging directory entries and marking data blocks as unused. This approach is significantly faster than secure deletion via data overwriting, and approaches and in some cases surpasses the speed of traditional file deletion via flagging entries.

As a first approximation, standard erasure time is linearly proportional to the number of files to be erased. Secure, destructive erasure time is linearly proportional to the size of the files to be erased. Using our file metadata erasure approach, erasure time is linear to number of files for small numbers of files. However, when a substantially large number proportion of files within a directory are erased, elapsed time will peak and decline making erasure times shorter and more predictable.

As used herein, erasing includes writing zeros or other data patterns to some or all of the location(s) of data, thereby displacing and/or overwriting the previous data and making that previous data unreadable and unavailable; performing an erase operation (such as are available on certain types of electrically erasable programmable read-only memory chips) that erases one or more entire blocks of data at once; setting status indicators (such as certain bits in a directory entry) that are interpreted and enforced by operating-system software as indicating that the storage locations of the data are not readable as data or instructions; and/or other suitable methods.

In some embodiments, the present invention provides an erasure mechanism that is more expensive to defeat than the cost of the erased content. The cost of a conventional undeletion of a conventionally deleted file can be trivial. Accordingly, a more-secure mechanism should be used. The cost of defeating high-security erasure could be many times greater than the value of the erased panoplex content, but the use of high-security erasure exacts a toll on the manufacturer or retailer in terms of throughput (e.g., machines per hour) of the customization process. Accordingly, a more efficient erasure mechanism is needed.

In some embodiments, removal of extraneous content of the panoplex uses a secure, quick erase that overwrites file directory information that would otherwise allow file reconstruction. Such directory information includes any file-in-use flag; file length; file-folder location; and cluster-allocation pointers. Such an erasure foils normal undelete programs and makes any attempt to reconstruct the content more costly than the cost of acquiring the content.

Deleting Single Files

Figure 1A:
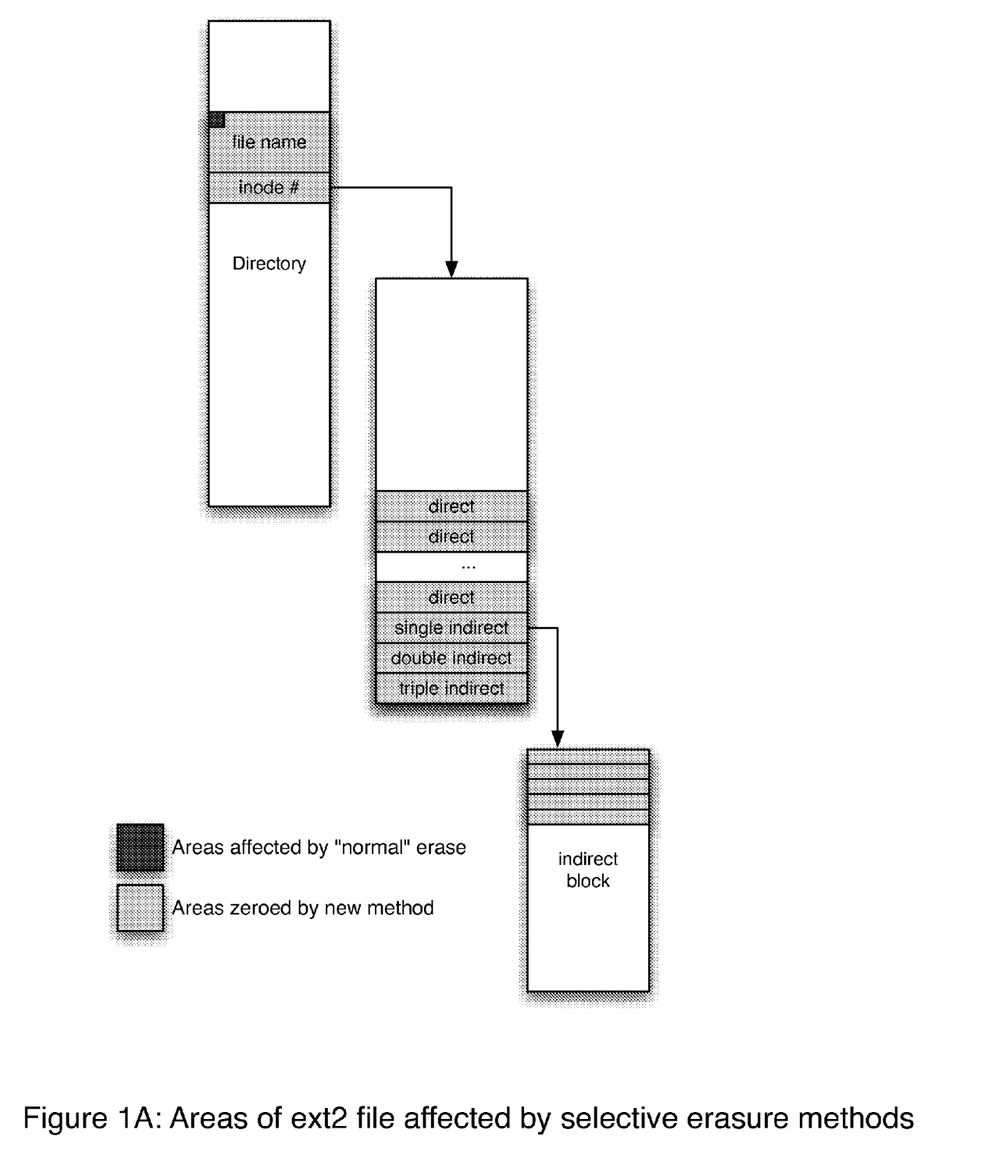
FIG. 1A is a schematic of areas within an ext2 file system affected by selective erasure
Figure 1B:
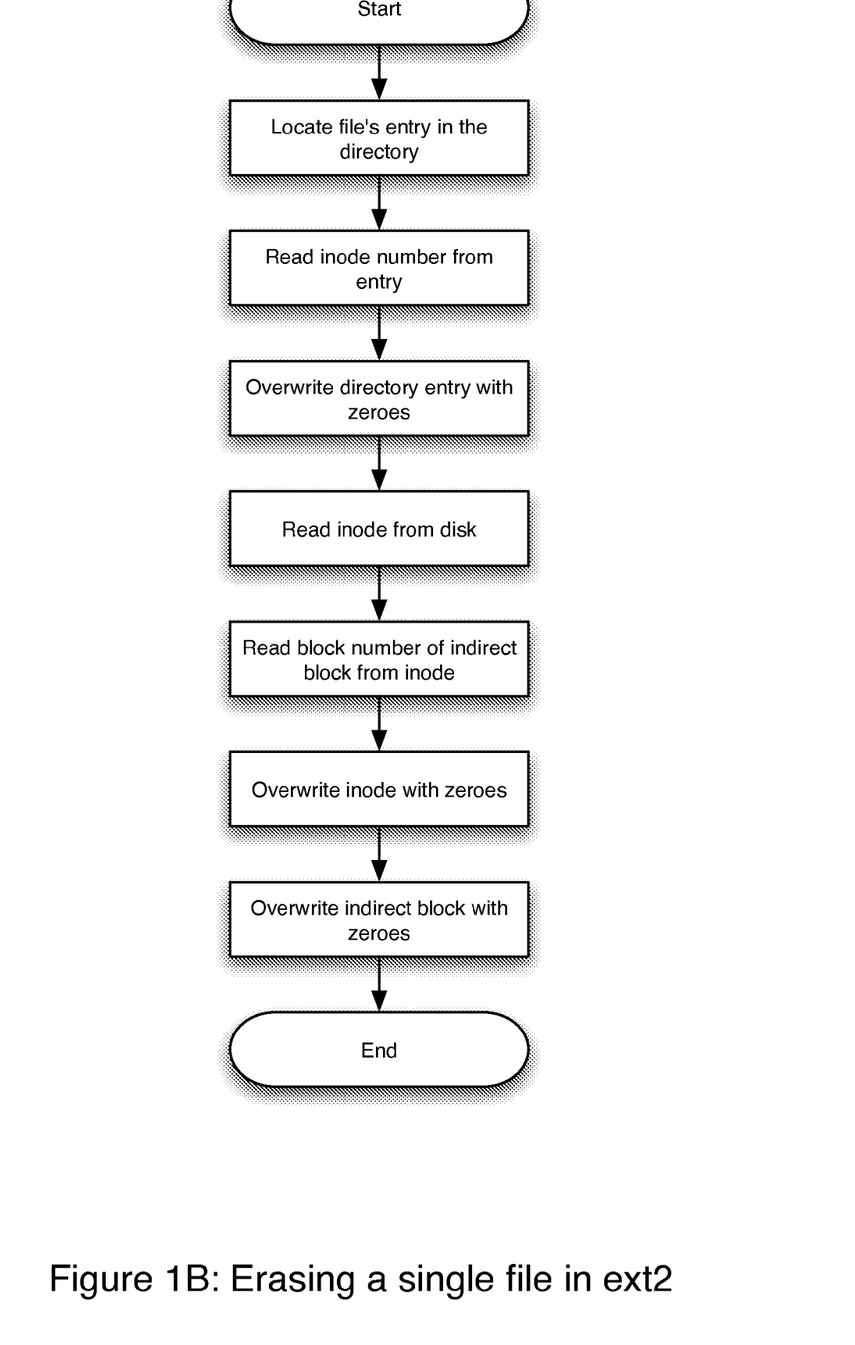
FIG. 1B is a flowchart relating to erasing a single file in an ext2 file system

Individual files are deleted by overwriting the entire directory entry with zeroes, rather than just setting a flag or byte in the directory entry. For the ext2 file system, this approach will destroy the file name and index node (inode) number of the file. For more complete security, the inode for the file should also be overwritten with zeros, hiding the file size, and the locations of the first 12 blocks in the file along with the location of extra block lists used to locate file blocks for files larger than 48 kilobytes. In ext2, this approach requires a single additional disk access to overwrite the inode with zeros; the time needed to write the zeros to the copy of the block in memory before writing it back to the media is negligible. Additional security can be obtained by overwriting the first block list of the deleted file (the "single indirect block") with zeros, hiding the identities of the blocks that make up the first 4 megabytes of the file. This changes made to the directory entry, inode, and file blocks are shown in FIG. 1A, with a flowchart in 1B. Note that FIGS. 1A and 1B elide the activities normally associated with deleting a file in ext2, including the manipulation of the free block bitmap; these operations are remain unchanged.

Figure 2A:
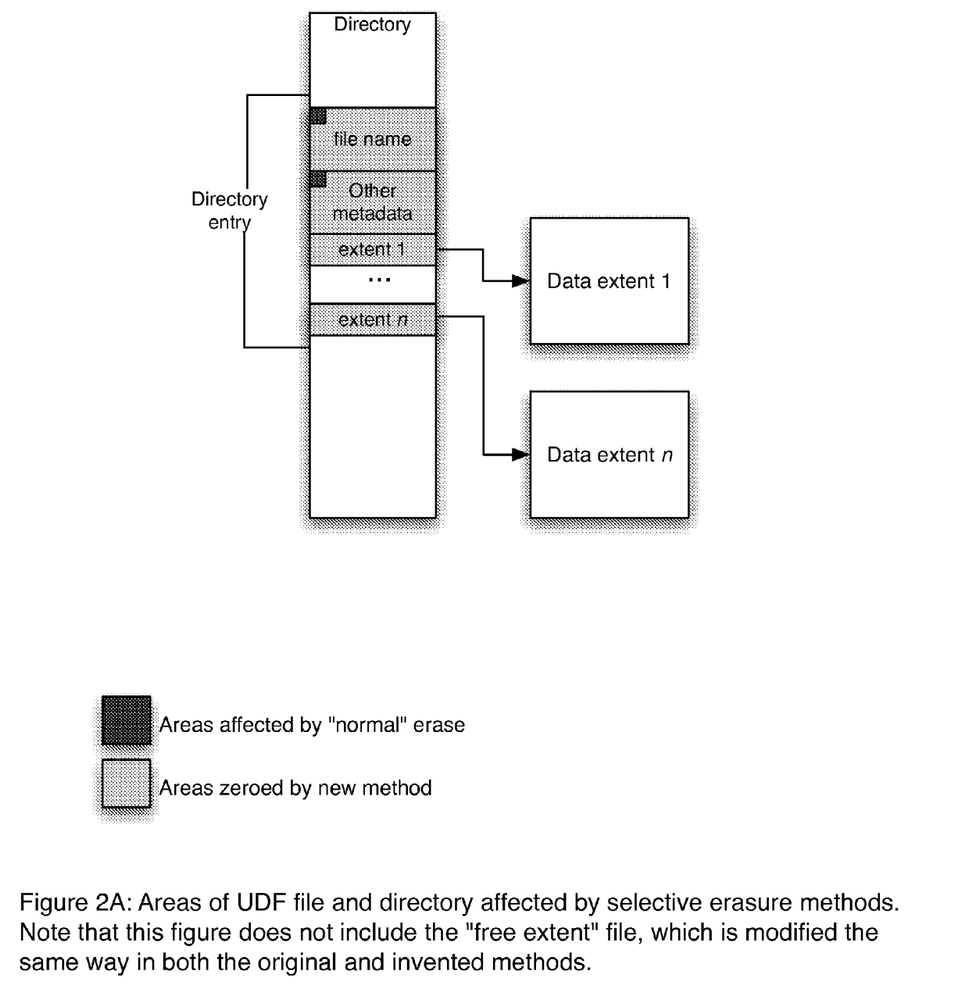
FIG. 2A is a schematic of areas within a UDF file system affected by selective erasure
Figure 2B:
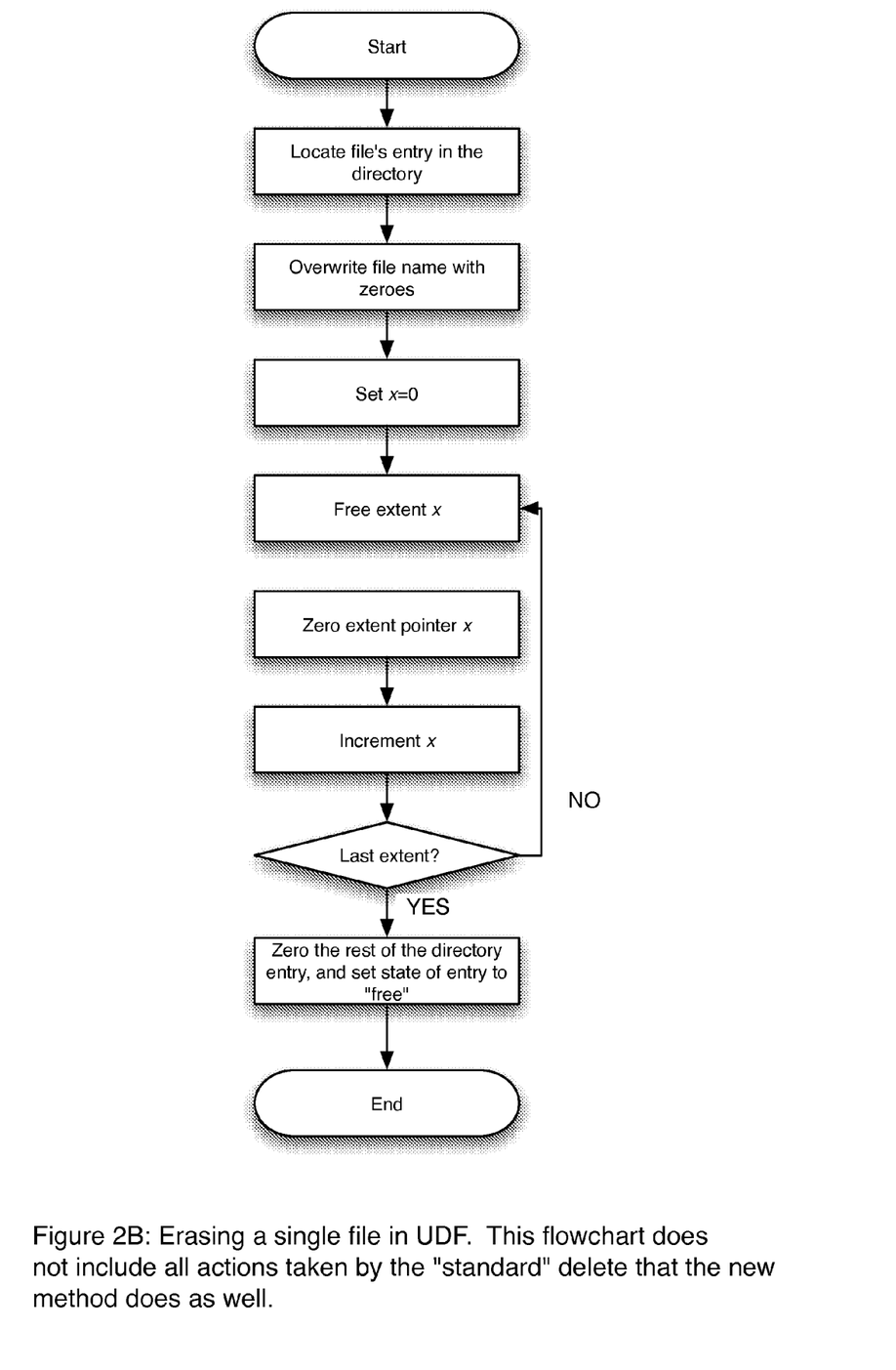
FIG. 2B is a flowchart relating to erasing a single file in a UDF file system

Deleting a single file in a UDF file system can be done similarly. Directories and file entries in a UDF file system are typically stored in a separate "metadata partition," and each file entry contains the locations of the extents (an extent is a set of 1 or more contiguous blocks). As in ext2, a directory entry contains a file name and a pointer to the file's file entry, which is similar to an inode in ext2. Each file entry can be up to one block long, so it is rarely necessary to place extent locations anywhere other than the file entry itself. In a UDF file system, overwriting the entire directory entry with zeros and then marking the directory entry as unused will obscure the existence of the file name and the location of the file entry, and can be done as quickly as a standard fast deletion that only marks the directory entry as unused. If greater security is desired, the file entry can be overwritten with zeros, effectively hiding the location of the contents of the file to which the entry pointed. All of these activities are done in addition to the normal actions taken when deleting a file in a UDF file system, including the addition of the location of the freed blocks to the free block list. The modifications made to the directory entry and file entry are shown in FIG. 2A, with a flowchart in FIG. 2B. As with ext2, FIGS. 2A and 2B elide operations associated with normal deletions.

Figure 3A:
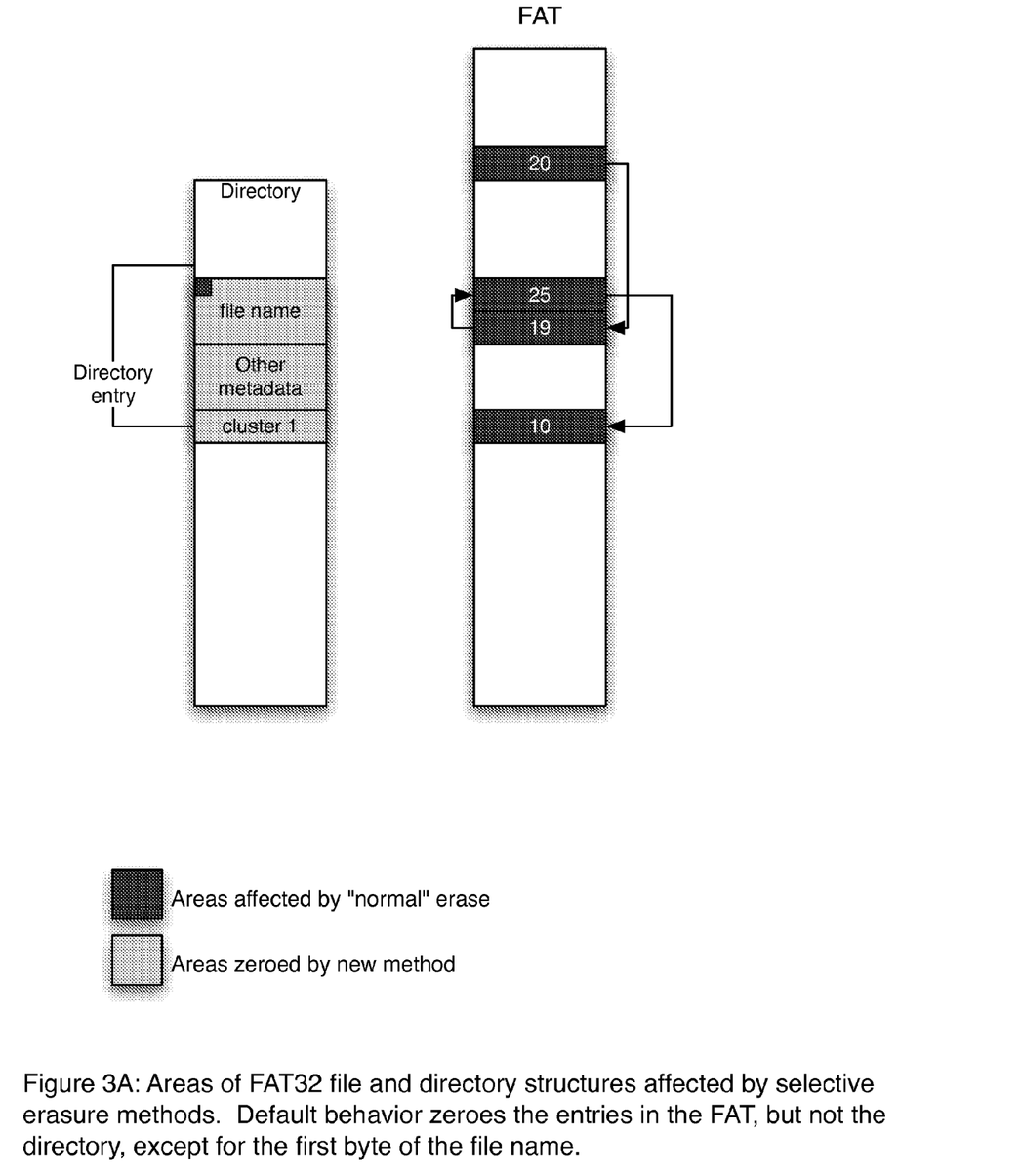
FIG. 3A is a schematic of areas within a FAT32 file and directory structure affected by selective erasure methods.
Figure 3B:
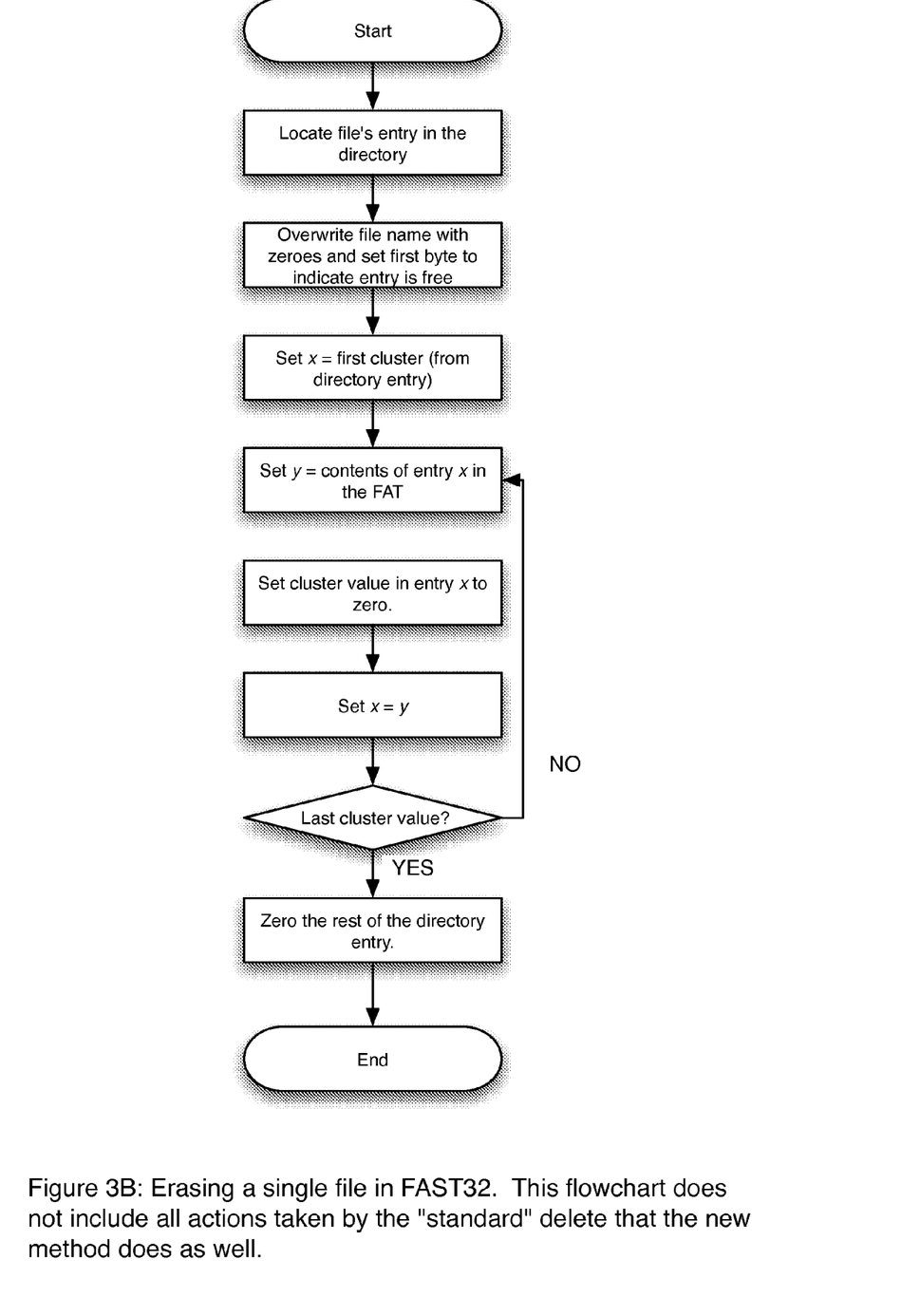
FIG. 3B is a flowchart relating to erasing a single file in a FAT32 file system

Deleting a single file in a FAT32 file system is similar to the operation in ext2 and UDF. The directory entry for a file in FAT32 contains the file name (with a possible extension to successive directory entries for long file names) along with attributes including the number of the first cluster (block) of the file's data. The file can be deleted by setting the first letter of the file name to a certain value (0×E5); however, this approach makes it trivial to recover the file's name, location, and size. Our approach sets the entire directory entry to zero, and with 0×E5 subsequently written to the first byte of the directory entry, marking the entry as available, as shown in FIGS. 3A and 3B. This approach completely hides both the file name, file size, and the location of its first cluster. As with a normal FAT32 file erase, the allocated cluster chain must be traversed and zeroed to free the blocks of the deleted file. This operation also makes it more difficult to recover a file by simply scanning the FAT. It is particularly strong when many files are deleted from a full file system. Metadata processing is here assumed to apply to both long and short name entries and both the primary and secondary FAT tables.

Deleting Large Numbers of Files

Altering directory entries individually works well for deletion of individual files, but can be optimized better for deleting large numbers of files. as might be done for distribution of a relative few files from a well-populated, relatively large storage medium. In such a case, the original directory structure might contain thousands of files, but each individually distributed disk might only retain relatively few files. Rather than produce totally new media for each such distribution, the construction of a new directory containing only the desired files could be used to quickly build a disk that contains just the desired files.

This goal can be accomplished by constructing a list containing the files that will be included in the new directory and scanning the original directory, copying only the desired files to a new directory. The original directory can then be deleted using metadata deletion or destructive deletion thus bulk erasing numerous files at once. The algorithms for the specific file systems listed below assume that the system has already assembled or been given a list of files to keep in the new directory. This list can be kept in any form; however, it is more efficient for the program doing the copying to keep the list in a hash table. It is possible to check whether a particular string (file name) is in the hash table in constant time, allowing the following procedures to run in time linearly proportional to the number of files in the original directory.

Figure 4:
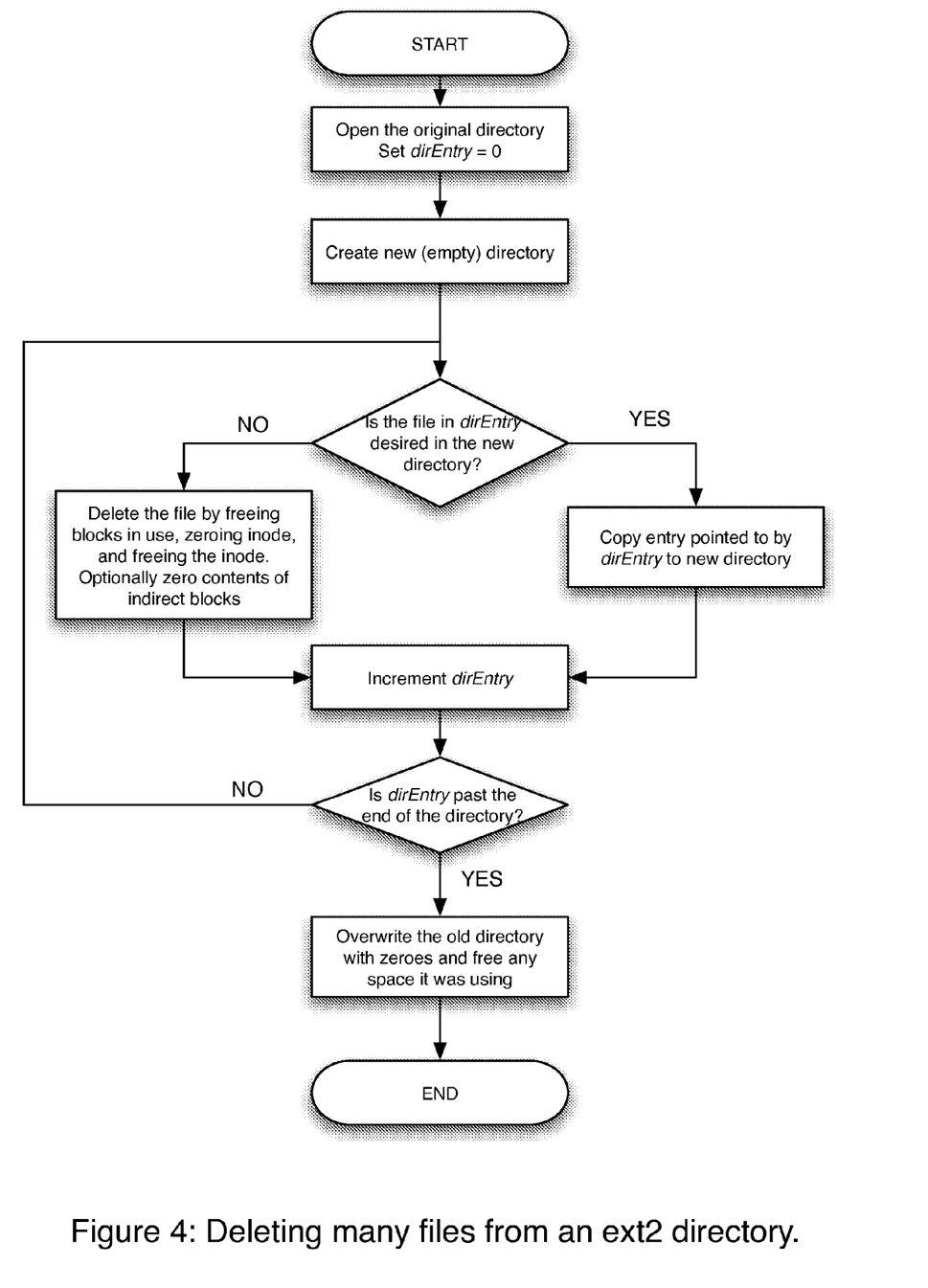
FIG. 4 is a flowchart relating to erasing multiple files in an ext2 file system

For an ext2 file system, a new (empty) directory is created, and the original directory is opened. Next, the process goes through each directory entry in the original directory in turn. If the file referenced by the directory entry is desired to be kept, the directory entry is copied from the old directory to the new directory. If the file referenced by the directory entry is not desired, the file may be optionally deleted as described above. This step might be unnecessary if the file system will not need to accommodate additional files, but is a good idea to keep the location of the deleted files from future users. After all of the entries in the old directory have been scanned, the old directory is deleted either through destructive or metadata erasure. This approach is illustrated in FIG. 4.

Figure 5:
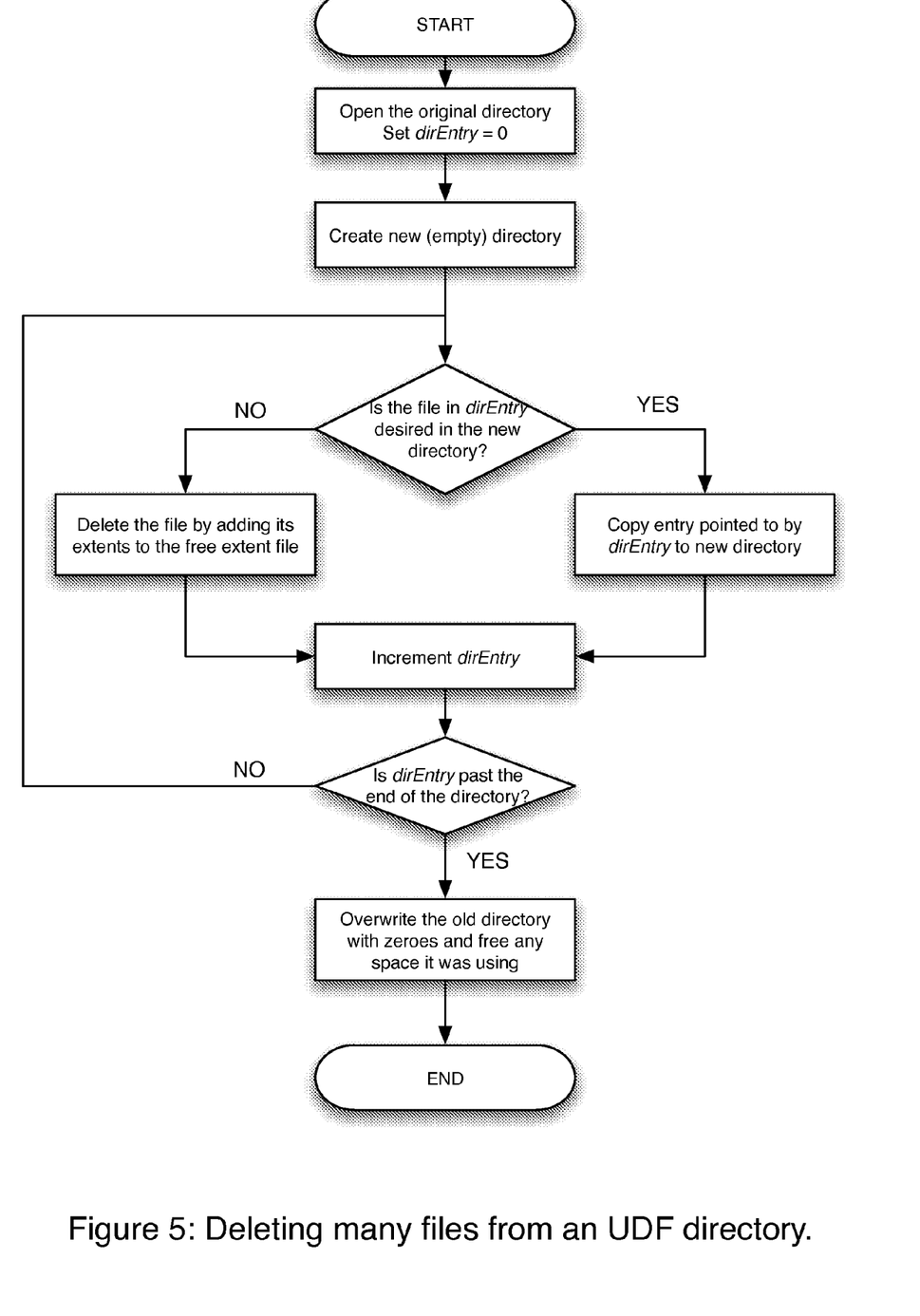
FIG. 5 is a flowchart relating to erasing multiple files in an UDF file system directory

The procedure for deleting multiple files is similar for a UDF file system. As above, a new (empty) directory is created, and the original (old) directory is opened. The user then examines each directory entry in turn, copying the entry if it is to be kept and optionally deleting the file if it is not desired in the new directory. After all directory entries have been examined, the old directory is deleted as above. This algorithm is shown in FIG. 5.

Figure 6A:
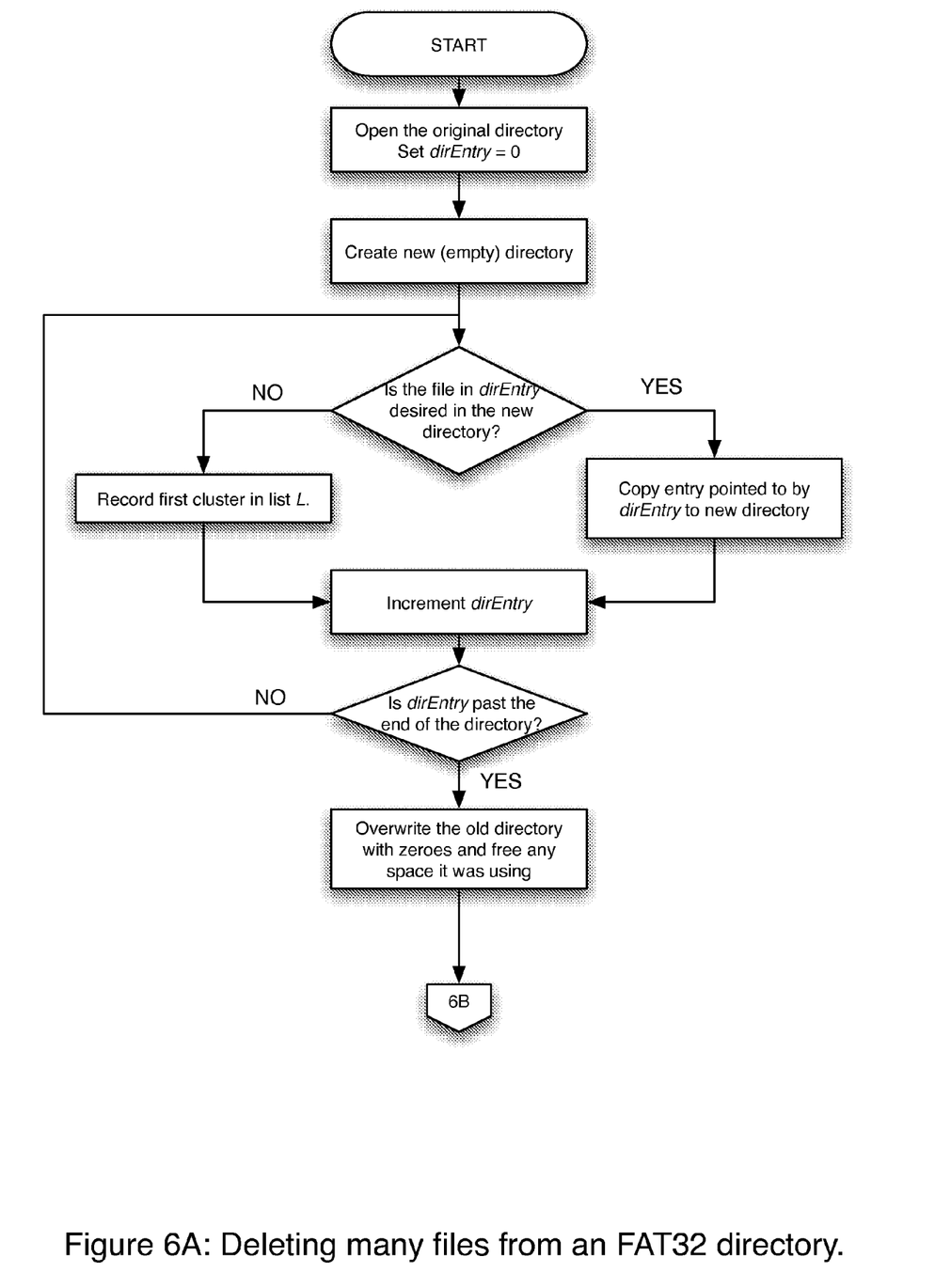
FIG. 6A is a flowchart relating to erasing multiple files in an FAT32 file system directory
Figure 6B:
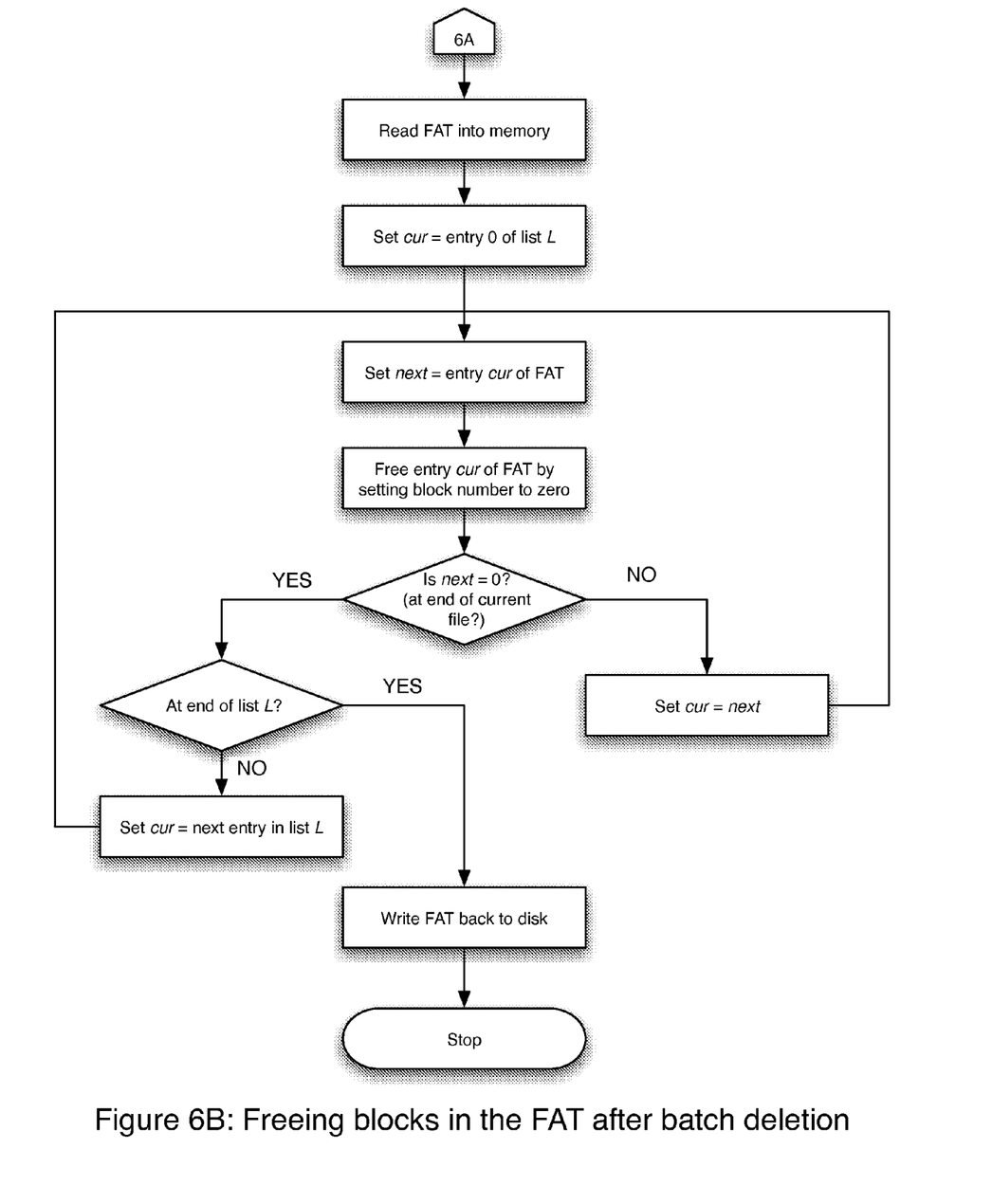
FIG. 6B is a flowchart relating to freeing blocks in an FAT32 file system after batch deletion

Deletion of many files in FAT32 also proceeds by creating a new (empty) directory and opening the original directory. The process then examines each directory entry in turn, copying the entry if it is to be kept and optionally deleting the file if it is not desired in the new directory. Deletion in this case consists of recording the first cluster used in the deleted file in a list. After all entries in the original directory have been examined and optionally copied to the new directory, the process reads in the FAT and deletes all of the files by starting at each deleted file's first cluster and following the pointers through the FAT, marking each visited pointer as free by zeroing it. By grouping all of the modifications to the FAT together, this approach can be much faster than deleting each file separately. This algorithm is shown in FIGS. 6A and 6B.

The above procedures work on a single directory, but many file systems contain large numbers of directories. In order to apply the above procedures to a tree of directories, the procedures should be applied recursively, with a directory being processed after all of its subdirectories have been processed. If this is done, empty directories can themselves be deleted and zeroed, further hiding the location of on-disk information.

If an entire FAT32 file system is processed recursively, as described in the previous paragraph, an additional optimization can be applied. The procedure listed above requires that each file be deleted individually. However, if an entire FAT32 file system is processed and only a few files are to be kept, the entire FAT32 can be rebuilt. In this approach, the list of files to be kept contains all of the files to be retained in the entire file system; thus, the new FAT contains only the information for the files in the list. If there are few files to be kept and many to be deleted, it will be faster to start with a "clean" FAT in which all blocks are marked free, and to then traverse the original FAT for each file to be kept, copying the information for each block in each file to be kept from the original FAT to the new FAT. Any directories to be created can then use blocks still marked "free" in the new FAT. The cross-over point for which approach is faster (delete individual files, or start with a "clean" FAT) varies and can be determined experimentally for a given system. In general, small list of files to be kept will be more quickly done by starting with a "clean" FAT, and that a system in which relatively few files are to be deleted will be handled more quickly using the approach in FIGS. 6A and 6B.

Consider a manufacturer of computers. In one instance, the business plan calls for build-to-order operation. Hard drives are components provided by a disk-drive manufacturer. In one method of this invention, the contract with the drive supplier can include preloading a selected plurality of file data into the drives and delivering these to the computer manufacturer. Alternatively the drives pass from the drive supplier to a contract manufacturer that loads the selected plurality of file data onto a disk. Alternatively, the original-equipment manufacturer (OEM), i.e., the brand-name manufacturer, loads the selected plurality of file data onto the drives. When an order is received from a customer, the order includes an indication of the customer's selection of the desired content. On the production line, the necessary customization is accomplished and the finished machine with the desired programs installed is delivered. In another instance, a manufacturer who builds computers to place in their inventory will store the finished machines; each loaded with the selected plurality of file data, and will later customize the devices, as needed, before shipping.

Obfuscating File Structure

In all of these scenarios, after file deletion, the data itself will still exist on the media, but would require considerable effort to recover. Nonetheless, in certain applications, be prudence might dictate taking additional precautions to make recovery of intact but erased files more difficult. Certain practices are particularly useful.

For example, many file systems, particularly those that utilize optical media, store the contents of a file in contiguous blocks on the media. In such a case, recovery simply consists of finding the first block of a file; the remaining blocks follow sequentially. To combat this problem, the blocks of a file should be written non-contiguously. To ensure that performance is still acceptable, however, the file could be stored as non-contiguous extents of reasonable size, say 128 kilobytes to 4 megabytes, making reassembly of the files without usable metadata much more difficult. It is important to note that data in such a file system is still potentially recoverable, but the cost and effort necessary to recover it should exceed the value of the files deleted in such a way.

Another approach to obfuscating file structure is to overwrite selected file blocks to make recovery more difficult. Overwriting just a few blocks in a large file can make the file unusable, especially if the file contains program code. This could be accomplished by overwriting the first block of the file and a small number of subsequent blocks with patterned or random bits. Overwriting the first block obscures the type of the file as well as information about the file's size, entry points, checksum, metadata tags, and other critical information. Overwriting a small number of subsequent blocks can render the entire file useless, particularly if the file contains executable program code. This technique can be used with any of the deletion mechanisms listed above to make file recovery considerably more difficult.

Figure 7:
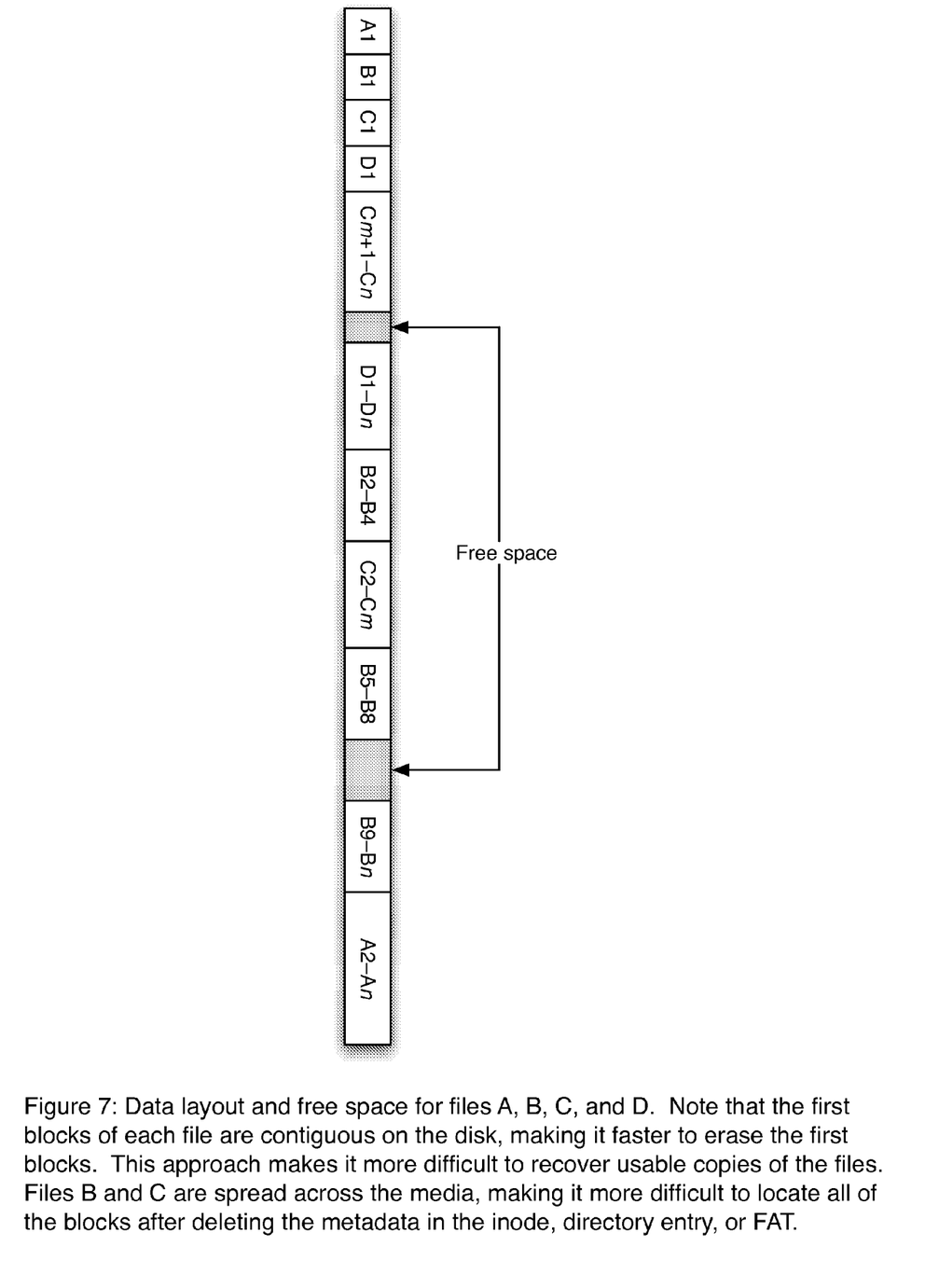
FIG. 7 is a data layout schema for enhancing batch deletion

The two approaches above are best combined by storing the first blocks of many files near one another, with the remainder of the files spread across the media. In this way, the first blocks of many files could be overwritten by writing patterns or random bits to large sequential chunks of the media. Since sequential writes are often much faster than writes to non-consecutive locations, this approach has the advantage of being able to obfuscate many files relatively quickly. In addition, the non-sequential storage of individual files would make it more difficult to locate them without the metadata that describes the location of the deleted files' contents. A diagram of this technique is shown in FIG. 7. Optionally after deletion, background storage defragmentation can be scheduled or immediately performed, to improve file access to the remaining unerased files. Furthermore, with Windows implementations, an optional cleanup of the Windows Registry to remove linkages or indicia to any of the erased files or programs is suggested.

While these techniques have been illustrated with several specific, currently widely-used file systems, they are of general application to any file system that manages physical storage. The above description is illustrative only and is not limiting. Instead, the present invention is defined solely by the claims which follow and their full range of equivalents.

What is claimed is:

1. A computer-implemented method for rendering a first subset of a plurality of file data inaccessible, wherein the plurality of file data are stored on a storage medium according to a file system, and at least some of the plurality of file data is arranged in a non-contiguous manner on the storage medium, wherein a first set of metadata describing the plurality of file data are also stored on the storage medium, wherein at least a second subset of the plurality of file data, stored on the storage medium are unavailable for use unless and until an erasing operation is performed on the first subset of the plurality of file data, and wherein the first set of metadata include a first set of directory information that identifies locations on the storage medium at which the plurality of file data are stored, the method comprising:

receiving an erase command that identifies the first subset of the plurality of file data comprising a first plurality of individually-identified files in the plurality of file data, all of which are to be erased as a result of the erase command, wherein the plurality of file data not identified as being in the first subset of the plurality of file data includes the second subset of the plurality of file data;

creating a second set of directory information in a second set of metadata by copying directory entries corresponding to the second subset of the plurality of file data from the first set of metadata into the second set of metadata such that the second set of directory information identifies locations on the storage medium at which the second subset of the plurality of file data is stored; and erasing at least a first portion of the first set of directory information that corresponds to the first plurality of individually-identified files such that, after the erasing, at least a first portion of the first subset of the plurality of file data cannot be located on the storage medium by reading either the first set of directory information or the second set of directory information, and wherein a substantial portion of the first plurality of individually-identified files remains intact on the storage medium.

2. The method of claim 1, wherein the first set of directory information includes file names and pointers corresponding to the plurality of file data and wherein the second set of directory information includes file names and pointers corresponding to the second subset of the plurality of file data.

3. The method of claim 1, wherein the first set of directory information includes mode data corresponding to the file plurality of data and wherein the second set of directory information includes mode data corresponding to the second subset of the plurality of file data.

4. The method of claim 1, wherein the second set of directory information identifies the locations by identifying additional metadata that in turn identifies the locations and wherein the second set of directory information identifies locations by identifying additional metadata that in turn identifies the locations of the second subset of the plurality of file data.

5. The method of claim 1, wherein the erasing of the first set of directory information includes erasing the first set of directory information such that an entirety of the first subset of the plurality of file data cannot be located on the storage medium by reading the first set of directory information or the second set of directory information metadata.

6. The method of claim 1, wherein the substantial portion of the first plurality of individually-identified files that remains intact on the storage medium is all of the first plurality of individually-identified files.

7. The method of claim 1, wherein a remaining portion of the first plurality of individually-identified files other than the substantial portion is not intact on the storage medium.

8. The method of claim 1, wherein the erasing includes overwriting.

9. The method of claim 1, wherein the erasing of the at least a first portion of the first set of the directory information includes overwriting the first collection of metadata.

10. The method of claim 1, wherein the erasing of the first set of directory information includes overwriting a first block of each one of the first plurality of individually-identified files and overwriting one or more blocks of each one of the first plurality of individually-identified files subsequent to the first block.

11. The method of claim 10, wherein the erasing of the first set of directory information includes overwriting an indirect block of each one of the first plurality of individually-identified files.

12. The method of claim 10, wherein the first set of directory information includes at least one directory entry, and wherein the erasing of the first set of directory information includes freeing space of any such directory entry that is erased.

13. The method of claim 10, wherein each of a plurality of first blocks associated with each one of the first plurality of individually-identified files are stored on the storage medium in a contiguous manner, and wherein each of a plurality of blocks other than the plurality of first blocks are stored on the storage medium in a non-contiguous manner.

14. The method of claim 1, wherein the file system is selected from the group consisting of:
   a FAT32 file system, and wherein the reassigning of each erased file location includes finding the first cluster from the erased file's directory entry and following the pointers through a file allocation table (FAT), marking each visited pointer as free by zeroing it;
   an ext2 file system, and wherein the reassigning of each erased file location includes freeing blocks in use, zeroing an mode, and freeing the mode; and
   a UDF file system and, wherein the reassigning of each erased file location includes adding the extents of the plurality of file data to the free extent file.

15. The method of claim 14, wherein the file system is the FAT32 file system, and wherein the method further comprises grouping the modifications to the file access table.

16. The method of claim 14, wherein the file system is the ext2 file system, and wherein the method further comprises zeroing the mode.

17. The method of claim 14, wherein the file system is the ext2 file system, and wherein the method further comprises zeroing indirect blocks.

18. The method of claim 14, wherein the file system is the ext2 file system, and wherein the method further comprises overwriting a first block list of the deleted file with zeroes.

19. The method of claim 1, wherein the list of files is kept as a hash table.

20. The method of claim 1, wherein the second subset of the plurality of file data comprises programs and percepta.

21. The method of claim 20, wherein the method is executed as part of a customization process of the storage media by a manufacturer of computers.

22. A computer system comprising:
   a processor;
   a memory operatively coupled to the processor;
   a storage medium operatively coupled to the processor, wherein a plurality of file data are stored the storage medium, and a first subset of the plurality of file data is stored according to a particular file system, wherein at least some of the first subset of the plurality of file data is arranged in a non-contiguous manner, wherein the storage medium includes a first set of metadata, and wherein the first set of metadata include a first set of directory information that identifies locations on the storage medium at which the plurality of file data are stored;
   a receiver operatively coupled to the processor and configured to receive an erase command that identifies the first subset of the plurality of file data comprising a first plurality of individually-identified files in the plurality of file data, all of which are to be erased as a result of the erase command, wherein the plurality of file data not identified as being in the first plurality of the first subset of the plurality of file data comprise a second subset of the plurality of file data;
   a creator module, wherein the creator module executes in the processor from the memory, and wherein the creator module, when executed by the processor, creates a second set of directory information in a second set of metadata by copying directory entries into the second set of metadata such that the second set of directory information identifies locations on the storage medium at which the second subset of the plurality of file data is stored;
   a delete module, wherein the delete module executes in the processor from the memory, and wherein the delete module, when executed by the processor, erases at least a first portion of the first set of directory information that corresponds to the first plurality of individually-identified files such that, after the delete module is executed, at least a first portion of the first subset of the plurality of file data cannot be located on the storage medium by reading either the first set of directory information or the second set of directory information, and wherein a substantial portion of the first plurality of individually-identified files remains intact on the storage medium, and wherein the delete module reassigns the location of the first subset of the plurality of file data on the storage medium for use by subsequent file data.

23. The system of claim 22, wherein the delete module, when executed by the processor, erases the first set of directory information such that
   a first block of each one of the first plurality of individually-identified files is overwritten, and
   one or more blocks of each one of the first plurality of individually-identified files subsequent to the first block are overwritten.

24. The system of claim 23, wherein the delete module, when executed by the processor, erases an indirect block of each one of the first plurality of individually-identified files.

25. The system of claim 23, wherein the first set of directory information includes at least one directory entry, and wherein the delete module, when executed by the processor, frees the space of any such directory entry.

26. The system of claim 23, wherein each of a plurality of first blocks associated with each one of the first plurality of individually-identified files are stored on the storage medium in a contiguous manner, and wherein each of a plurality of blocks other than the plurality of first blocks are stored on the storage medium in a non-contiguous manner.

27. A computer-readable medium useful in association with a computer which includes a processor and a memory, the computer-readable medium including computer instructions which are configured to cause the computer to perform a method for rendering a first subset of a plurality of file data stored on a storage medium inaccessible, wherein the plurality of file data is stored on a storage medium according to a particular file system, and at least some of the plurality of file data is arranged in a non-contiguous manner on the storage medium, wherein a first set of metadata describing the plurality of file data as specified by the particular file system are also stored on the storage medium, wherein at least a second subset of the plurality of file data stored on the storage medium are unavailable for use unless and until an erasing operation is performed on the first subset of the plurality of file data, and wherein the first set of metadata include a first set of directory information that identifies locations on the storage medium at which the plurality of file data are stored, the method comprising:

receiving an erase command that identifies the first subset of the plurality of file data comprising a first plurality of individually-identified files in the plurality of file data, all of which are to be erased as a result of the erase command, wherein the plurality of file data not identified as being in the first subset of the plurality of file data includes the second subset of the plurality of file data;

creating a second set of directory information in a second set of metadata by copying directory entries corresponding to the second subset of the plurality of file data from the first set of metadata into the second set of metadata such that the second set of directory information identifies locations on the storage medium at which the second subset of the plurality of file data is stored; and erasing at least a first portion of the first set of directory information that corresponds to the first plurality of individually-identified files such that, after the erasing, at least a first portion of the first subset of the plurality of file data cannot be located on the storage medium by reading either the first set of the plurality of directory information or the second set of directory information, and wherein a substantial portion of the first plurality of individually-identified files remains intact on the storage medium.

* * * * *